United States Patent
Tan et al.

(10) Patent No.: US 9,950,707 B2
(45) Date of Patent: Apr. 24, 2018

(54) METHOD FOR CONTROLLING A VEHICLE IN ACCORDANCE WITH PARAMETERS PREFERRED BY AN IDENTIFIED DRIVER

(71) Applicant: MAGNA ELECTRONICS INC., Auburn Hills, MI (US)

(72) Inventors: Honghao Tan, Northville, MI (US); Brian J. Tedesco, Novi, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/488,715

(22) Filed: Apr. 17, 2017

(65) Prior Publication Data

US 2017/0217428 A1    Aug. 3, 2017

Related U.S. Application Data

(63) Continuation of application No. 14/675,927, filed on Apr. 1, 2015, now Pat. No. 9,623,878.

(Continued)

(51) Int. Cl.
    *B60W 30/14*      (2006.01)
    *B60W 30/02*      (2012.01)
    (Continued)

(52) U.S. Cl.
    CPC .......... *B60W 30/025* (2013.01); *B60W 10/04* (2013.01); *B60W 10/18* (2013.01); *B60W 10/20* (2013.01); *B60W 30/16* (2013.01); *G05D 1/0088* (2013.01); *G05D 1/0231* (2013.01); *B60W 2420/42* (2013.01); *B60W 2420/52* (2013.01); *B60W 2540/30* (2013.01);

(Continued)

(58) Field of Classification Search
CPC ............. B60T 2201/03; B60T 2201/08; B60T 2201/02; B60T 8/172; B60W 10/18; B60W 10/20; B60W 10/22; B60W 2540/30; B60W 2710/202; B60W 2750/30; B60W 30/02; B60W 30/08; B60W 30/12; B60W 30/143; B60W 40/09; B60W 40/08
USPC .......................... 701/41, 93, 36, 38, 70, 28
See application file for complete search history.

(56) References Cited

U.S. PATENT DOCUMENTS

| 4,829,434 A | 5/1989 | Karmel |
| 4,987,357 A | 1/1991 | Masaki |

(Continued)

*Primary Examiner* — Dalena Tran
(74) *Attorney, Agent, or Firm* — Honigman Miller Schwartz and Cohn, LLP

(57) ABSTRACT

A method for controlling a vehicle includes providing a plurality of sensors at an equipped vehicle, capturing, via the plurality of sensors, data, and determining, via processing by a data processor of data captured by at least some of the plurality of sensors, information pertaining to distance to other vehicles present exterior the equipped vehicle. Information is determined pertaining to lane geometry of a lane of a road along which the equipped vehicle is traveling. Information is provided pertaining to at least one of (i) acceleration of the equipped vehicle, (ii) braking of the equipped vehicle and (iii) steering of the equipped vehicle. Information is provided identifying a driver operating the equipped vehicle. Responsive to identification of the driver operating the equipped vehicle, the equipped vehicle is controlled in accordance with a personalized parameter set for the identified driver and in accordance with data processing by the data processor.

57 Claims, 2 Drawing Sheets

Related U.S. Application Data

(60) Provisional application No. 61/973,922, filed on Apr. 2, 2014.

(51) Int. Cl.

| | | |
|---|---|---|
| *G05D 1/00* | (2006.01) | |
| *G05D 1/02* | (2006.01) | |
| *B60W 10/04* | (2006.01) | |
| *B60W 10/18* | (2012.01) | |
| *B60W 10/20* | (2006.01) | |
| *B60W 30/16* | (2012.01) | |

(52) U.S. Cl.
CPC ... *B60W 2550/12* (2013.01); *B60W 2550/146* (2013.01); *B60W 2550/308* (2013.01); *B60W 2710/18* (2013.01); *B60W 2710/20* (2013.01); *B60W 2720/10* (2013.01); *B60W 2720/106* (2013.01)

(56) References Cited

U.S. PATENT DOCUMENTS

| | | |
|---|---|---|
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,059,877 A | 10/1991 | Teder |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,130,709 A | 7/1992 | Toyama et al. |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,949,331 A | 9/1999 | Schofield et al. |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |

(56) References Cited

U.S. PATENT DOCUMENTS

| | | | |
|---|---|---|---|
| 6,100,799 A | 8/2000 | Fenk | |
| 6,144,022 A | 11/2000 | Tenenbaum et al. | |
| 6,175,300 B1 | 1/2001 | Kendrick | |
| 6,198,996 B1* | 3/2001 | Berstis | B60R 25/2018 |
| | | | 701/36 |
| 6,201,642 B1 | 3/2001 | Bos et al. | |
| 6,223,114 B1 | 4/2001 | Boros et al. | |
| 6,266,082 B1 | 7/2001 | Yonezawa et al. | |
| 6,266,442 B1 | 7/2001 | Laumeyer et al. | |
| 6,285,393 B1 | 9/2001 | Shimoura et al. | |
| 6,294,989 B1 | 9/2001 | Schofield et al. | |
| 6,297,781 B1 | 10/2001 | Turnbull et al. | |
| 6,310,611 B1 | 10/2001 | Caldwell | |
| 6,317,057 B1 | 11/2001 | Lee | |
| 6,320,282 B1 | 11/2001 | Caldwell | |
| 6,333,759 B1 | 12/2001 | Mazzilli | |
| 6,353,392 B1 | 3/2002 | Schofield et al. | |
| 6,370,329 B1 | 4/2002 | Teuchert | |
| 6,392,315 B1 | 5/2002 | Jones et al. | |
| 6,396,397 B1 | 5/2002 | Bos et al. | |
| 6,411,204 B1 | 6/2002 | Bloomfield et al. | |
| 6,424,273 B1 | 7/2002 | Gutta et al. | |
| 6,430,303 B1 | 8/2002 | Naoi et al. | |
| 6,442,465 B2 | 8/2002 | Breed et al. | |
| 6,477,464 B2 | 11/2002 | McCarthy et al. | |
| 6,497,503 B1 | 12/2002 | Dassanayake et al. | |
| 6,498,620 B2 | 12/2002 | Schofield et al. | |
| 6,534,884 B2 | 3/2003 | Marcus et al. | |
| 6,539,306 B2 | 3/2003 | Turnbull | |
| 6,553,130 B1 | 4/2003 | Lemelson et al. | |
| 6,594,583 B2 | 7/2003 | Ogura et al. | |
| 6,611,610 B1 | 8/2003 | Stam et al. | |
| 6,636,258 B2 | 10/2003 | Strumolo | |
| 6,672,731 B2 | 1/2004 | Schnell et al. | |
| 6,690,268 B2 | 2/2004 | Schofield et al. | |
| 6,704,621 B1 | 3/2004 | Stein et al. | |
| 6,711,474 B1 | 3/2004 | Treyz et al. | |
| 6,735,506 B2 | 5/2004 | Breed et al. | |
| 6,744,353 B2 | 6/2004 | Sjönell | |
| 6,795,221 B1 | 9/2004 | Urey | |
| 6,806,452 B2 | 10/2004 | Bos et al. | |
| 6,819,231 B2 | 11/2004 | Berberich et al. | |
| 6,823,241 B2 | 11/2004 | Shirato et al. | |
| 6,824,281 B2 | 11/2004 | Schofield et al. | |
| 6,850,156 B2 | 2/2005 | Bloomfield et al. | |
| 6,889,161 B2 | 5/2005 | Winner et al. | |
| 6,909,753 B2 | 6/2005 | Meehan et al. | |
| 6,946,978 B2 | 9/2005 | Schofield | |
| 6,975,775 B2 | 12/2005 | Rykowski et al. | |
| 6,989,736 B2 | 1/2006 | Berberich et al. | |
| 7,004,606 B2 | 2/2006 | Schofield | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,079,017 B2 | 7/2006 | Lang et al. | |
| 7,085,637 B2 | 8/2006 | Breed et al. | |
| 7,092,548 B2 | 8/2006 | Laumeyer et al. | |
| 7,111,968 B2 | 9/2006 | Bauer et al. | |
| 7,116,246 B2 | 10/2006 | Winter et al. | |
| 7,123,168 B2 | 10/2006 | Schofield | |
| 7,136,753 B2 | 11/2006 | Samukawa et al. | |
| 7,145,519 B2 | 12/2006 | Takahashi et al. | |
| 7,149,613 B2 | 12/2006 | Stam et al. | |
| 7,161,616 B1 | 1/2007 | Okamoto et al. | |
| 7,195,381 B2 | 3/2007 | Lynam et al. | |
| 7,202,776 B2 | 4/2007 | Breed | |
| 7,227,611 B2 | 6/2007 | Hull et al. | |
| 7,365,769 B1 | 4/2008 | Mager | |
| 7,460,951 B2 | 12/2008 | Altan | |
| 7,490,007 B2 | 2/2009 | Taylor et al. | |
| 7,526,103 B2 | 4/2009 | Schofield et al. | |
| 7,592,928 B2 | 9/2009 | Chinomi et al. | |
| 7,639,149 B2 | 12/2009 | Katoh | |
| 7,681,960 B2 | 3/2010 | Wanke et al. | |
| 7,720,580 B2 | 5/2010 | Higgins-Luthman | |
| 7,724,962 B2 | 5/2010 | Zhu et al. | |
| 7,855,755 B2 | 12/2010 | Weller et al. | |
| 7,881,496 B2 | 2/2011 | Camilleri et al. | |
| 7,952,490 B2 | 5/2011 | Fechner et al. | |
| 8,013,780 B2 | 9/2011 | Lynam et al. | |
| 8,027,029 B2 | 9/2011 | Lu et al. | |
| 8,634,980 B1 | 1/2014 | Urmson | |
| 8,849,495 B2 | 9/2014 | Chundrlik, Jr. et al. | |
| 8,954,255 B1 | 2/2015 | Crawford | |
| 9,014,915 B2 | 4/2015 | Chatterjee | |
| 9,623,878 B2 | 4/2017 | Tan et al. | |
| 2002/0015153 A1 | 2/2002 | Downs | |
| 2002/0113873 A1 | 8/2002 | Williams | |
| 2003/0137586 A1 | 7/2003 | Lewellen | |
| 2003/0222982 A1 | 12/2003 | Hamdan et al. | |
| 2004/0114381 A1 | 6/2004 | Salmeen et al. | |
| 2005/0137757 A1* | 6/2005 | Phelan | G01M 17/00 |
| | | | 701/1 |
| 2006/0018511 A1 | 1/2006 | Stam et al. | |
| 2006/0018512 A1 | 1/2006 | Stam et al. | |
| 2006/0091813 A1 | 5/2006 | Stam et al. | |
| 2006/0103727 A1 | 5/2006 | Tseng | |
| 2006/0164221 A1 | 7/2006 | Jensen | |
| 2006/0250501 A1 | 11/2006 | Wildmann et al. | |
| 2006/0290479 A1 | 12/2006 | Akatsuka et al. | |
| 2007/0104476 A1 | 5/2007 | Yasutomi et al. | |
| 2009/0093938 A1 | 4/2009 | Isaji et al. | |
| 2009/0113509 A1 | 4/2009 | Tseng et al. | |
| 2009/0177347 A1 | 7/2009 | Breuer et al. | |
| 2009/0243824 A1 | 10/2009 | Peterson et al. | |
| 2009/0244361 A1 | 10/2009 | Gebauer et al. | |
| 2009/0265069 A1 | 10/2009 | Desbrunes | |
| 2010/0020170 A1 | 1/2010 | Higgins-Luthman et al. | |
| 2010/0023223 A1* | 1/2010 | Huang | B60W 40/09 |
| | | | 701/44 |
| 2010/0228437 A1 | 9/2010 | Hanzawa et al. | |
| 2012/0044066 A1 | 2/2012 | Mauderer et al. | |
| 2012/0062743 A1 | 3/2012 | Lynam et al. | |
| 2012/0218412 A1 | 8/2012 | Dellantoni et al. | |
| 2012/0262340 A1 | 10/2012 | Hassan et al. | |
| 2013/0124052 A1 | 5/2013 | Hahne | |
| 2013/0129150 A1 | 5/2013 | Saito | |
| 2013/0131918 A1 | 5/2013 | Hahne | |
| 2014/0067206 A1 | 3/2014 | Pflug | |
| 2014/0156157 A1 | 6/2014 | Johnson et al. | |
| 2014/0222280 A1 | 8/2014 | Salomonsson | |
| 2014/0313339 A1 | 10/2014 | Diessner et al. | |
| 2014/0379233 A1 | 12/2014 | Chundrlik, Jr. et al. | |
| 2015/0203116 A1 | 7/2015 | Fairgrieve | |

* cited by examiner

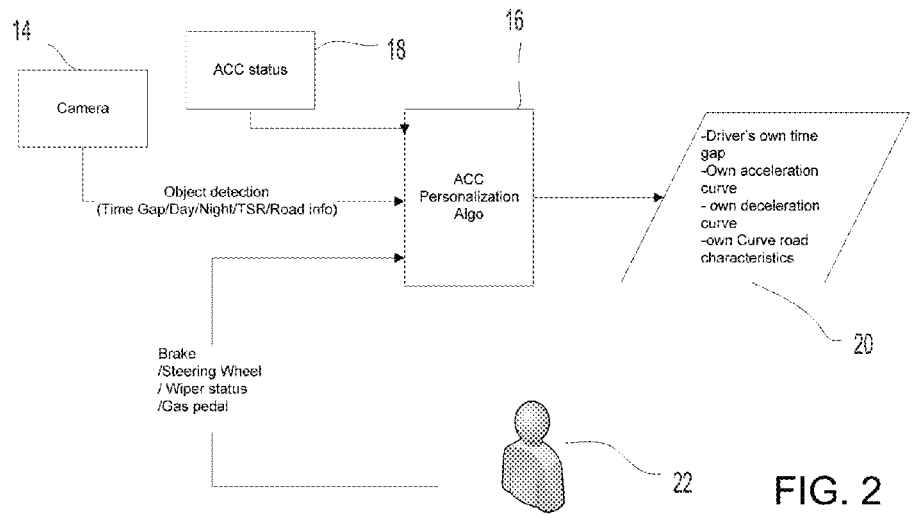

FIG. 2

```
Pseudo logic of ACC Learning Algo
If ACCOff
{
Action1 : Observe the time gap/accl/decel/cure Accel in different traffic scenarios
(following/cut in/cut out);
Action 2: confirm that those are typical repeated pattern;
Action3: adjust the time gap setting for (Near/Medium/Far) to match how driver behaves;
Action4: adjust the ACC acceleration curve to match how driver behaves;
Action5: adjust the ACC deceleration curve to match how driver behaves;
Action6: adjust ACC acceleration curve on curve road to match how driver behaves;
}
Else % ACC is ON
{
Action1: Observe the time gap/accl/decel/cure Accel
         during the driver override behavior (gas/brake)
Action 2: confirm that those are typical repeated pattern;
Action3: adjust the time gap setting for (Near/Medium/Far) to match how driver behaves;
Action4: adjust the ACC acceleration curve to match how driver behaves;
Action5: adjust the ACC deceleration curve to match how driver behaves;
Action6: adjust ACC acceleration curve on curve road to match how driver behaves;
}

Note: weather condition from EQ3 should be taken into account in the time gap/accl/decl/cure
accel observation)
```

FIG. 3

METHOD FOR CONTROLLING A VEHICLE IN ACCORDANCE WITH PARAMETERS PREFERRED BY AN IDENTIFIED DRIVER

CROSS REFERENCE TO RELATED APPLICATIONS

The present application is a continuation of U.S. patent application Ser. No. 14/675,927, filed Apr. 1, 2015, now U.S. Pat. No. 9,623,878, which claims the filing benefits of U.S. provisional application Ser. No. 61/973,922, filed Apr. 2, 2014, which is hereby incorporated herein by reference in its entirety.

TECHNICAL FIELD OF THE INVENTION

The present invention generally relates to driver assistance systems, and more particularly to personalized autonomous driving systems which learn driver habits.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system that includes a personalization algorithm or system or process that learns the preferences or driving behavior of a particular driver and adapts or adjusts or modifies parameters of the driver assistance system so that the driver assistance system controls the vehicle in a manner similar to the manner that the particular driver controls the vehicles in similar driving conditions. The system is responsive to a determination or identification of a particular driver and to a determination of the road and/or driving conditions. Thus, when the driver assistance system (such as an adaptive cruise control system or the like) is activated, the system may control the acceleration/deceleration/steering of the vehicle in a manner that is preferred by the particular driver.

These and other objects, advantages, purposes and features of the present invention will become apparent upon review of the following specification in conjunction with the drawings.

BRIEF DESCRIPTION OF THE DRAWINGS

FIG. 2 shows an exemplary personalized autonomous cruise control system in accordance with the present invention; and FIG. 3 is a pseudo code listing showing an exemplary personalization algorithm for an autonomous cruise control system.

DETAILED DESCRIPTION OF THE PREFERRED EMBODIMENTS

Figure 1:
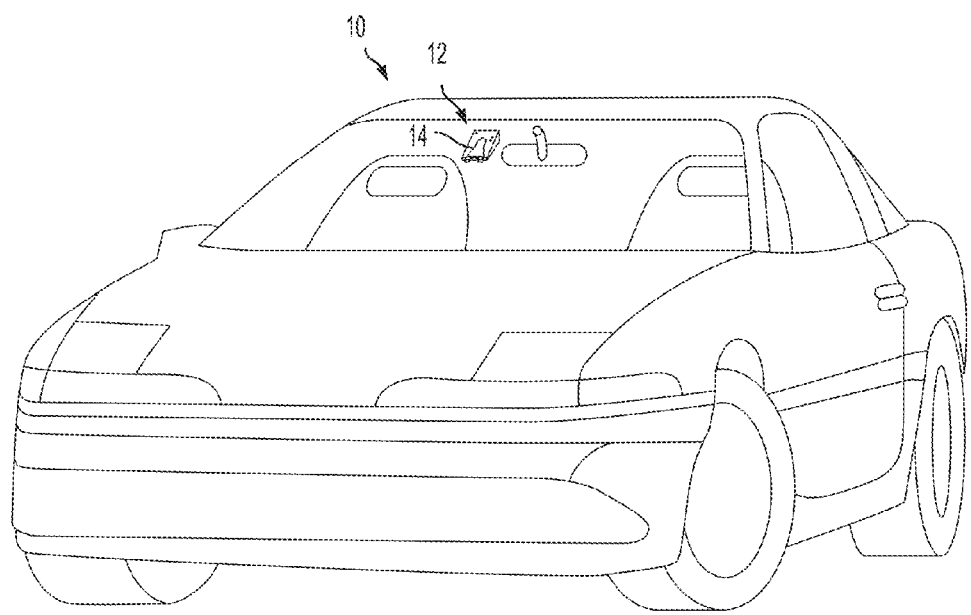
FIG. 1 is a perspective view of a vehicle equipped with a driver assistance system of the present invention.

A vehicle driver assist system and/or vision system and/or object detection system and/or alert system may utilize one or more sensors at the vehicle, such as one or more cameras that operate to capture images exterior of the vehicle, whereby an image processor may process the captured image data such as for displaying images and/or for detecting objects or the like at or near the vehicle and in the predicted path of the vehicle, such as to assist a driver of the vehicle in maneuvering the vehicle in a forward and/or rearward direction.

Referring now to the drawings and the illustrative embodiments depicted therein, a vehicle 10 includes a driver assistance system 12 that may include at least one exterior facing imaging sensor or camera, such as a forward facing camera 14 (optionally, the system may include a rearward facing imaging sensor or camera and may optionally include multiple exterior facing imaging sensors or cameras, such as a forwardly facing camera at the front (or at the windshield) of the vehicle, and a sidewardly/rearwardly facing camera at respective sides of the vehicle, which capture images exterior of the vehicle (FIG. 1). The camera has a lens for focusing images at or onto an imaging array or imaging plane or imager of the camera. The driver assistance system includes a control or electronic control unit (ECU) or processor that is operable to process image data captured by the cameras (or to process other data captured by other sensors of the vehicle) and may provide displayed images at a display device for viewing by the driver of the vehicle. The data transfer or signal communication from the camera to the ECU may comprise any suitable data or communication link, such as a vehicle network bus or the like of the equipped vehicle.

Autonomous or Adaptive Cruise Control (ACC) Systems are known to control the longitudinal distance between a host vehicle and a target vehicle. Such systems comprise sensors and control algorithms to control acceleration or deceleration of the host vehicle. Suitable sensors to detect a preceding vehicle are for example a radar sensor, a lidar sensor, a monocular camera or a stereo camera.

Lane Keep Assist (LKA) Systems are known to control the lateral position of a host vehicle as it approaches a lane marking. Such systems comprise sensors and control algorithms to applying torque to the steering system. Suitable sensors to detect lane markings are a monocular camera or a stereo camera.

Lane Centering (LC) Systems are known to control the lateral position of a host vehicle within a lane. Such systems comprise sensors and control algorithms to applying torque to the steering system. Suitable sensors to detect lane markings are a monocular camera or a stereo camera.

Existing systems may provide limited ability to adjust to a driver's preference. For example, an autonomous cruise control system may offer a "near", "mid" and "far" setting to adjust a following target distance. However, such adjustments are limited, and do not reflect the wide range of individual driving preferences by human drivers.

Referring to FIGS. 2 and 3, an exemplary personalized autonomous cruise control system is shown. A personalization algorithm 16 is provided within a suitable embedded control module. Preferably, the personalization algorithm 16 is embedded in the same module as the autonomous cruise control algorithms. The personalization algorithm 16 receives various inputs. Firstly, the personalization algorithm 16 is in communication with the autonomous or adaptive cruise control (ACC) system 18. From the autonomous cruise control system 18, the personalization algorithm 16 receives information about whether the autonomous cruise control system is enabled or disabled (in other words, whether acceleration of the vehicle is controlled by the driver or by the ACC system 18). If ACC is active, the information from the ACC system 18 further comprises the currently requested acceleration. The term "acceleration" is here used to refer to both positive and negative acceleration (in other words, it includes deceleration).

The personalization algorithm 16 is further in communication with environment sensors, such as a machine vision camera 14 (such as the forward facing camera 14 in FIG. 1). The machine vision camera 14 is adapted to sense and communicate information about the surrounding of the host vehicle. Such information includes, for example, the distance and relative velocity to a preceding vehicle (ahead of the subject or equipped vehicle). Optionally, such information may include information about whether it is daytime, twilight, or nighttime or whether it is dry or raining or snowing or the like. The information may further include information about traffic signs that have been passed, and may indicate a speed limit that may apply. The information may also include information about road surface characteristics, such as whether the road surface is smooth or bumpy, possibly estimating a friction coefficient of the road. The information may further comprise information about lane geometry. Lane geometry may be communicated in the form of a polynomial representation of the lanes ahead of the host vehicle, and can be used to determine, for example, the width of the lane the host vehicle is travelling in, or the curvature of the road ahead of the vehicle.

The personalization algorithm 16 is further in communication with vehicle sensors that communicate the present state of the vehicle, which is ultimately determined by a driver 22. Such sensors may include, for example, accelerator pedal position and brake pedal position. They may include a steering angle sensor or steering wheel angle sensor. They may further include information identifying the driver, such as, for example, by determining which seat position has been selected in a memory seat module or the like. Information may also include wiper status or outside temperature.

The personalization algorithm 16 processes data received via various inputs to create a personalized parameter set 20 for the adaptive cruise control system. The personalized parameter set 20 comprises parameters that determine the ACC system's response to particular driving scenarios. The personalized parameter set 20 may comprise, for example, a following gap parameter that determines at what time gap the host vehicle follows a preceding vehicle. Traditionally, ACC systems allow adjustment of the following gap in predetermined steps, such as, for example, a "near" setting, a "mid" setting and a "far" setting. Here, the following gap parameter is more flexible, allowing, for example, a following gap preference to be adjustable between a lower threshold of about 0.7 seconds or thereabouts and an upper threshold of about three seconds or thereabouts.

The personalized parameter set 20 may also comprise parameters that determine how rapidly the host vehicle accelerates if a preceding vehicle changes lanes and is no longer relevant, or how aggressively the host vehicle decelerated after a cut-in of another vehicle into the host vehicle's lane. The personalized parameter set may also comprise parameters that determine how an ACC target speed is adjusted depending on the radius of an upcoming curve.

Traditionally, adjusting ACC parameters is done by calibration engineers, who tune a "one size fits all" parameter set for a given vehicle. The present invention may utilize such a default setting, but allows for personalized changes to the personalized parameter set as the personalization algorithm 16 learns the behavior of the driver 22. This learning may occur while the driver is driving manually (in other words, not using ACC). During manual driving, the personalization algorithm 16 will observe or monitor the driver's behavior in predetermined driving situations. For example, the personalization algorithm may calculate an average time gap at which the driver 22 is following a preceding vehicle while driving on a wide road during daytime in the rain. This average may be stored in the parameter set 20 and used when using the ACC system is used in similar driving conditions.

Learning may also occur while the ACC system is active, such as when the driver is overriding the ACC system's acceleration. For example, the driver may manually accelerate more aggressively, after a preceding vehicle has left the host vehicle lane. In that case, that personalization algorithm 16 may, over time, adjust the corresponding parameter in the parameter set 20, to allow the ACC system to use more aggressive acceleration in similar situations.

Optionally, the system may provide personalization or customization of parameters of a lane keep assist system or lane departure warning system or lane centering system or the like. The personalization algorithm may allow the driver to establish preferences as to how the vehicle travels in and along a lane and/or how the system provides or generates an alert when the vehicle moves towards an edge or lane marker of the travelled lane or the like. For example, the system may, responsive to identification of a particular driver and that driver's preferences, adjust the threshold level at which an alert is generated as the vehicle moves towards a lane marker or out of a lane in which the vehicle is traveling or adjust the threshold level at which a steering adjustment is made as the vehicle moves towards a lane marker or out of a lane in which the vehicle is traveling.

Therefore, the present invention provides a customizable or personalized driver assistance system, such as a customizable or personalized adaptive cruise control system. The system monitors a particular driver's driving behavior in various driving conditions and stores to memory different driving maneuvers that the driver typically undertakes in particular driving conditions (such as rapid acceleration when a preceding vehicle leaves the subject vehicle's lane when the road is substantially dry). The system stores various driver behaviors under various driving conditions, road conditions, weather conditions and/or the like, so that when the driver uses the ACC system of the vehicle, the ACC system tends to accelerate/decelerate/drive the vehicle like that particular driver (and not necessarily like the default ACC system settings). Thus, responsive to the system identifying the particular driver (such as via a user input or selection or image processing of image data captured by a cabin monitoring cabin to recognize the driver's face or the like), the system may adjust the ACC parameters (and/or parameters of other driver assistance system or systems of the vehicle) to control the various driver assistance systems or accessories to the driver's preference. For example, the system may adjust the control of the vehicle brakes, steering and/or accelerator (such as when the ACC system is activated) and/or may adjust an intermittent windshield wiper setting or the like to generally match the driver's preferences as learned by the system.

The system may be at least responsive to weather conditions and/or road conditions so that the adjusted parameters are appropriate for the particular driver and for the particular driving conditions being experienced by the driver and vehicle. The system may include limits that limit how far the system may adjust the parameters to maintain safety during use of the ACC system. For example, if the driver tends to follow very closely behind preceding vehicles, the system will not adjust the ACC system to follow the preceding vehicle at an unsafe distance.

The system may use one or more cameras to monitor the road and/or weather conditions and/or the like. The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Publication Nos. US-2006-0061008 and/or US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:
1. A method for controlling a vehicle, said method comprising:
providing a plurality of sensors at an equipped vehicle, the plurality of sensors sensing exterior of the equipped vehicle;
wherein the plurality of sensors comprises at least one forward viewing image sensor;
capturing, via the plurality of sensors, data;

providing a control at the equipped vehicle that, when the control is operating in a driving assist mode, provides at least one of (i) adaptive cruise control, (ii) lane keep assist and (iii) lane centering;

wherein the control, when operating in the driving assist mode, is operable to control (i) acceleration of the equipped vehicle, (ii) braking of the equipped vehicle and (iii) steering of the equipped vehicle;

wherein the control, when not operating in the driving assist mode, allows for driver control of acceleration, braking and steering of the equipped vehicle;

providing a data processor at the equipped vehicle for processing data captured by the plurality of sensors;

determining, via processing by the data processor of data captured by at least some of the plurality of sensors, information pertaining to distance to other vehicles present exterior the equipped vehicle;

determining, via processing by the data processor of data captured by at least the forward viewing image sensor of the plurality of sensors, information pertaining to lane geometry of a lane of a road along which the equipped vehicle is traveling;

identifying to the data processor a driver present in the equipped vehicle and capable of operating the equipped vehicle;

when the control is not operating in the driving assist mode and the identified driver is operating the equipped vehicle, providing to the data processor information pertaining to (i) acceleration of the equipped vehicle by the identified driver, (ii) braking of the equipped vehicle by the identified driver and (iii) steering of the equipped vehicle by the identified driver;

when the control is not operating in the driving assist mode and the identified driver is operating the equipped vehicle, determining driving conditions associated with the provided information;

determining a personalized parameter set for the identified driver, wherein the personalized parameter set comprises information pertaining to driving behavior of the identified driver during various driving conditions;

when the control is operating in the driving assist mode and the identified driver is not operating the equipped vehicle, and responsive to determination of a current driving condition of the equipped vehicle, controlling the equipped vehicle in accordance with the personalized parameter set for the identified driver and the determined current driving condition and in accordance with data processing by the data processor of data captured by at least some of the plurality of sensors; and wherein the determined personalized parameter set for the identified driver comprises at least one parameter selected from the group consisting of (i) how rapidly the equipped vehicle, when driven by the identified driver, accelerates if a preceding vehicle changes lane and is no longer in the lane along which the equipped vehicle is traveling, (ii) how aggressively the equipped vehicle, when driven by the identified driver, decelerates after a cut-in by another vehicle into the lane in which the equipped vehicle is traveling, and (iii) how the speed of the equipped vehicle, when driven by the identified driver, is adjusted responsive to a radius of curvature of an upcoming road curve ahead of the equipped vehicle.

2. The method of claim 1, wherein controlling the equipped vehicle in accordance with the personalized parameter set and the determined current driving condition and in accordance with data processing by the data processor comprises controlling the equipped vehicle responsive to (i) determined information pertaining to distance to other vehicles, (ii) determined information pertaining to lane geometry, and (iii) provided information pertaining to acceleration, braking and steering of the equipped vehicle.

3. The method of claim 1, comprising creating the personalized parameter set for the identified driver by learning, while the identified driver is manually driving a vehicle on a road, at least one parameter indicative of the identified driver's preference for operation of or use of at least one accessory or system of the vehicle.

4. The method of claim 3, comprising learning, while the identified driver is manually driving the vehicle on the road, the at least one parameter responsive at least in part to at least one of (i) determined information pertaining to distance to other vehicles, (ii) determined information pertaining to lane geometry, and (iii) provided information pertaining to acceleration, braking and steering of the vehicle.

5. The method of claim 4, wherein the vehicle the driver is manually driving on the road during learning is the equipped vehicle.

6. The method of claim 1, comprising determining, via processing by the data processor of data captured by at least some of the plurality of sensors, information pertaining to an ambient light level at the equipped vehicle.

7. The method of claim 1, comprising determining, via processing by the data processor of data captured by at least some of the plurality of sensors, information pertaining to traffic signs present in the field of sensing of the plurality of sensors.

8. The method of claim 1, comprising determining, via processing by the data processor of data captured by at least some of the plurality of sensors, information pertaining to a road surface characteristic of the road along which the equipped vehicle is traveling.

9. The method of claim 1, wherein the data processor comprises an image processor, and wherein determining information pertaining to lane geometry comprises determining, via processing by the image processor of image data captured by the forward viewing image sensor, information pertaining to lane geometry of the lane of the road along which the equipped vehicle is traveling.

10. The method of claim 1, wherein determining information pertaining to lane geometry comprises determining, via processing by the data processor of data captured by at least the forward viewing image sensor of the plurality of sensors, information pertaining to a width of the lane of the road along which the equipped vehicle is traveling.

11. The method of claim 1, wherein determining information pertaining to lane geometry comprises determining, via processing by the data processor of data captured by at least the forward viewing image sensor of the plurality of sensors, information pertaining to road curvature ahead of the equipped vehicle.

12. The method of claim 11, wherein the data processor comprises an image processor, and wherein information pertaining to road curvature ahead of the equipped vehicle is established, at least in part, by processing by the image processor of image data captured by the forward viewing image sensor of the plurality of sensors, and wherein the forward viewing image sensor is disposed at a windshield of the equipped vehicle and views through the windshield and forwardly in the direction of forward travel of the equipped vehicle.

13. The method of claim 1, comprising processing data received at the data processor to create a personalized parameter set for a particular identified driver based on how the identified driver operates the equipped vehicle during various driving conditions.

14. The method of claim 1, wherein controlling the equipped vehicle in accordance with the personalized parameter set and the determined current driving condition and in accordance with data processing by the data processor comprises controlling the equipped vehicle in a semi-autonomous mode.

15. The method of claim 1, wherein controlling the equipped vehicle in accordance with the personalized parameter set and the determined current driving condition and in accordance with data processing by the data processor comprises controlling the equipped vehicle in an autonomous mode.

16. The method of claim 1, wherein controlling the equipped vehicle in accordance with the personalized parameter set and the determined current driving condition and in accordance with data processing by the data processor comprises controlling the equipped vehicle while an adaptive cruise control system of the equipped vehicle is activated.

17. The method of claim 16, wherein the data processor comprises an image processor, and wherein distance of the equipped vehicle behind a leading vehicle ahead of the equipped vehicle is established, at least in part, by processing by the image processor of image data captured by the forward viewing image sensor of the plurality of sensors, and wherein the forward viewing image sensor is disposed at a windshield of the equipped vehicle and views through the windshield and forwardly in the direction of forward travel of the equipped vehicle.

18. The method of claim 17, wherein the personalized parameter set comprises a preferred target following distance for the adaptive cruise control system to use in establishing a distance of the equipped vehicle behind a leading vehicle ahead of the equipped vehicle.

19. The method of claim 18, comprising adjusting the preferred target following distance to maintain a safe following distance.

20. The method of claim 1, wherein the personalized parameter set comprises an acceleration preference of the identified driver and a deceleration preference of the identified driver.

21. The method of claim 1, wherein controlling the equipped vehicle in accordance with the personalized parameter set comprises at least one of (i) controlling a lane keep assist system of the equipped vehicle in accordance with the personalized parameter set, (ii) controlling a lane departure warning system of the equipped vehicle in accordance with the personalized parameter set and (iii) controlling a lane centering system of the equipped vehicle in accordance with the personalized parameter set.

22. The method of claim 21, comprising generating an alert or adjusting the steering of the equipped vehicle responsive to a threshold level movement of the equipped vehicle towards a lane marker or out of a lane in which the equipped vehicle is traveling.

23. The method of claim 1, wherein the personalized parameter set comprises a plurality of parameters, and wherein said method comprises selecting an appropriate one of the plurality of parameters responsive to a determined driving condition of the equipped vehicle.

24. The method of claim 23, wherein the determined driving condition comprises a determined one of a daytime driving condition and a nighttime driving condition.

25. The method of claim 24, wherein the determined driving condition comprises a determined one of a dry driving condition, a rain driving condition and a snow driving condition.

26. The method of claim 1, wherein the personalized parameter set comprises parameters for different driving conditions, and wherein the different driving conditions at least comprise different road conditions of a road travelled along by a vehicle driven by the identified driver.

27. The method of claim 1, wherein the forward viewing image sensor views forward of the equipped vehicle.

28. The method of claim 27, wherein the forward viewing image sensor is disposed at a windshield of the equipped vehicle and views through the windshield and forwardly in the direction of forward travel of the equipped vehicle.

29. The method of claim 1, wherein providing a plurality of sensors comprises providing a plurality of radar sensors at the equipped vehicle.

30. The method of claim 1, wherein providing a plurality of sensors comprises providing a plurality of image sensors at the equipped vehicle.

31. A method for controlling a vehicle, said method comprising:

providing a plurality of sensors at an equipped vehicle, the plurality of sensors sensing exterior of the equipped vehicle;

wherein the plurality of sensors comprises at least one forward viewing image sensor and at least one sensor selected from the group consisting of a radar sensor and a lidar sensor;

capturing, via the plurality of sensors, data;

providing a control at the equipped vehicle that, when the control is operating in a driving assist mode, provides at least one of (i) adaptive cruise control, (ii) lane keep assist and (iii) lane centering;

wherein the control, when operating in the driving assist mode, is operable to control (i) acceleration of the equipped vehicle, (ii) braking of the equipped vehicle and (iii) steering of the equipped vehicle;

wherein the control, when not operating in the driving assist mode, allows for driver control of acceleration, braking and steering of the equipped vehicle;

providing a data processor at the equipped vehicle for processing data captured by the plurality of sensors;

determining, via processing by the data processor of data captured by at least some of the plurality of sensors, information pertaining to distance to other vehicles present exterior the equipped vehicle;

determining, via processing by the data processor of data captured by at least the forward viewing image sensor of the plurality of sensors, information pertaining to road curvature ahead of the equipped vehicle;

identifying to the data processor a driver present in the equipped vehicle and capable of operating the equipped vehicle;

when the control is not operating in the driving assist mode and the identified driver is operating the equipped vehicle, providing to the data processor information pertaining to (i) acceleration of the equipped vehicle by the identified driver, (ii) braking of the equipped vehicle by the identified driver and (iii) steering of the equipped vehicle by the identified driver;

when the control is not operating in the driving assist mode and the identified driver is operating the equipped vehicle, determining driving conditions associated with the provided information;

determining a personalized parameter set for the identified driver, wherein the personalized parameter set comprises information pertaining to driving behavior of the identified driver during various driving conditions;

when the control is operating in the driving assist mode and the identified driver is not operating the equipped vehicle, and responsive to determination of a current driving condition of the equipped vehicle, controlling the equipped vehicle in accordance with the personalized parameter set for the identified driver and the determined current driving condition and in accordance with data processing by the data processor of data captured by at least some of the plurality of sensors; and wherein the determined personalized parameter set for the identified driver comprises at least one parameter selected from the group consisting of (i) how rapidly the equipped vehicle, when driven by the identified driver, accelerates if a preceding vehicle changes lane and is no longer in the lane along which the equipped vehicle is traveling, (ii) how aggressively the equipped vehicle, when driven by the identified driver, decelerates after a cut-in by another vehicle into the lane in which the equipped vehicle is traveling, and (iii) how the speed of the equipped vehicle, when being driven by the identified driver, is adjusted responsive to a radius of curvature of an upcoming road curve ahead of the equipped vehicle.

32. The method of claim 31, wherein controlling the equipped vehicle in accordance with the personalized parameter set and the determined current driving condition and in accordance with data processing by the data processor comprises controlling the equipped vehicle responsive to (i) determined information pertaining to distance to other vehicles, (ii) determined information pertaining to lane width, (iii) determined information pertaining to road curvature and (iv) provided information pertaining to acceleration, braking and steering of the equipped vehicle.

33. The method of claim 31, comprising creating the personalized parameter set for the identified driver by learning, while the identified driver is manually driving a vehicle on a road, at least one parameter indicative of the identified driver's preference for operation of or use of at least one accessory or system of the vehicle.

34. The method of claim 33, comprising learning, while the identified driver is manually driving the vehicle on the road, the at least one parameter responsive at least in part to at least one of (i) determined information pertaining to distance to other vehicles, (ii) determined information pertaining to lane geometry, and (iii) provided information pertaining to acceleration, braking and steering of the vehicle.

35. The method of claim 34, wherein the vehicle the driver is manually driving on the road during learning is the equipped vehicle.

36. The method of claim 31, wherein the data processor comprises an image processor, and wherein distance of the equipped vehicle behind a leading vehicle ahead of the equipped vehicle is established, at least in part, by processing by the image processor of image data captured by the forward viewing image sensor of the plurality of sensors, and wherein the forward viewing image sensor is disposed at a windshield of the equipped vehicle and views through the windshield and forwardly in the direction of forward travel of the equipped vehicle.

37. The method of claim 31, comprising determining, via processing by the data processor of data captured by at least some of the plurality of sensors, information pertaining to an ambient light level at the equipped vehicle.

38. The method of claim 31, comprising determining, via processing by the data processor of data captured by at least some of the plurality of sensors, information pertaining to traffic signs present in the field of sensing of the plurality of sensors.

39. The method of claim 31, comprising determining, via processing by the data processor of data captured by at least some of the plurality of sensors, information pertaining to a road surface characteristic of the road along which the equipped vehicle is traveling.

40. The method of claim 31, comprising determining, via processing by the data processor of data captured by at least the forward viewing image sensor of the plurality of sensors, information pertaining to distance to other vehicles present exterior the equipped vehicle.

41. The method of claim 31, comprising determining, via processing by the data processor of data captured by at least the forward viewing image sensor of the plurality of sensors, information pertaining to a width of the lane of the road along which the equipped vehicle is traveling.

42. A method for controlling a vehicle, said method comprising:

providing a plurality of sensors at an equipped vehicle, the plurality of sensors sensing exterior of the equipped vehicle;

wherein the plurality of sensors comprises at least one forward viewing image sensor;

capturing, via the plurality of sensors, data;

providing a control at the equipped vehicle that, when the control is operating in a driving assist mode, provides at least one of (i) adaptive cruise control, (ii) lane keep assist and (iii) lane centering;

wherein the control, when operating in the driving assist mode, is operable to control (i) acceleration of the equipped vehicle, (ii) braking of the equipped vehicle and (iii) steering of the equipped vehicle;

wherein the control, when not operating in the driving assist mode, allows for driver control of acceleration, braking and steering of the equipped vehicle;

providing a data processor at the equipped vehicle for processing data captured by the plurality of sensors;

determining, via processing by the data processor of data captured by at least some of the plurality of sensors, information pertaining to distance to other vehicles present exterior the equipped vehicle;

determining, via processing by the data processor of data captured by at least the forward viewing image sensor of the plurality of sensors, information pertaining to lane geometry of a lane of the road along which the equipped vehicle is traveling;

identifying to the data processor a driver present in the equipped vehicle and capable of operating the equipped vehicle;

when the control is not operating in the driving assist mode and the identified driver is operating the equipped vehicle, providing to the data processor information pertaining to (i) acceleration of the equipped vehicle by the identified driver, (ii) braking of the equipped vehicle by the identified driver and (iii) steering of the equipped vehicle by the identified driver;

when the control is not operating in the driving assist mode and the identified driver is operating the equipped vehicle, determining driving conditions associated with the provided information;

determining a personalized parameter set for the identified driver, wherein the personalized parameter set comprises information pertaining to driving behavior of the identified driver during various driving conditions;

when the control is operating in the driving assist mode and the identified driver is not operating the equipped vehicle, and responsive to determination of a current driving condition of the equipped vehicle, controlling the equipped vehicle in accordance with the personalized parameter set for the identified driver and the determined current driving condition and in accordance with data processing by the data processor of data captured by at least some of the plurality of sensors;

wherein the determined personalized parameter set for the identified driver comprises at least one parameter selected from the group consisting of (i) how rapidly the equipped vehicle, when driven by the identified driver, accelerates if a preceding vehicle changes lane and is no longer in the lane along which the equipped vehicle is traveling, (ii) how aggressively the equipped vehicle, when driven by the identified driver, decelerates after a cut-in by another vehicle into the lane in which the equipped vehicle is traveling, and (iii) how the speed of the equipped vehicle, when driven by the identified driver, is adjusted responsive to a radius of curvature of an upcoming road curve ahead of the equipped vehicle;

wherein controlling the equipped vehicle in accordance with the personalized parameter set and the determined current driving condition and in accordance with data processing by the data processor comprises controlling the equipped vehicle while an adaptive cruise control system of the equipped vehicle is activated; and wherein the personalized parameter set for the identified driver comprises a preferred target following distance for the adaptive cruise control system to use in establishing a distance of the equipped vehicle behind a leading vehicle ahead of the equipped vehicle.

43. The method of claim 42, wherein controlling the equipped vehicle in accordance with the personalized parameter set and the determined current driving condition and in accordance with data processing by the data processor comprises controlling the equipped vehicle responsive to (i) determined information pertaining to distance to other vehicles, (ii) determined information pertaining to lane geometry, and (iii) provided information pertaining to acceleration, braking and steering of the equipped vehicle.

44. The method of claim 42, comprising creating the personalized parameter set for the identified driver by learning, while the identified driver is manually driving a vehicle on a road, at least one parameter indicative of the identified driver's preference for operation of or use of at least one accessory or system of the vehicle.

45. The method of claim 44, comprising learning, while the identified driver is manually driving the vehicle on the road, the at least one parameter responsive at least in part to at least one of (i) determined information pertaining to distance to other vehicles, (ii) determined information pertaining to lane geometry, and (iii) provided information pertaining to acceleration, braking and steering of the vehicle.

46. The method of claim 45, wherein the vehicle the driver is manually driving on the road during learning is the equipped vehicle.

47. The method of claim 42, wherein controlling the equipped vehicle in accordance with the personalized parameter set and the determined current driving condition and in accordance with data processing by the data processor comprises controlling the equipped vehicle while an adaptive cruise control system of the equipped vehicle is activated.

48. The method of claim 47, wherein the personalized parameter set comprises a preferred target following distance for the adaptive cruise control system to use in establishing a distance of the equipped vehicle behind a leading vehicle ahead of the equipped vehicle.

49. The method of claim 48, comprising adjusting the preferred target following distance to maintain a safe following distance.

50. The method of claim 42, comprising generating an alert or adjusting the steering of the equipped vehicle responsive to a threshold level movement of the equipped vehicle towards a lane marker or out of a lane in which the equipped vehicle is traveling.

51. The method of claim 42, wherein providing a plurality of sensors comprises providing a plurality of radar sensors at the equipped vehicle.

52. The method of claim 42, wherein providing a plurality of sensors comprises providing a plurality of image sensors at the equipped vehicle.

53. The method of claim 42, wherein the personalized parameter set comprises an acceleration preference of the identified driver and a deceleration preference of the identified driver.

54. The method of claim 42, wherein controlling the equipped vehicle in accordance with the personalized parameter set comprises at least one of (i) controlling a lane keep assist system of the equipped vehicle in accordance with the personalized parameter set, (ii) controlling a lane departure warning system of the equipped vehicle in accordance with the personalized parameter set and (iii) controlling a lane centering system of the equipped vehicle in accordance with the personalized parameter set.

55. The method of claim 42, wherein the personalized parameter set comprises a preferred target following distance to maintain a predetermined safe following distance for a particular determined driving condition.

56. The method of claim 42, wherein the data processor comprises an image processor, and wherein distance of the equipped vehicle behind a leading vehicle ahead of the equipped vehicle is established, at least in part, by processing by the image processor of image data captured by the forward viewing image sensor of the plurality of sensors, and wherein the forward viewing image sensor is disposed at a windshield of the equipped vehicle and views through the windshield and forwardly in the direction of forward travel of the equipped vehicle.

57. The method of claim 56, wherein determining information pertaining to lane geometry comprises determining, via processing by the image processor of image data captured by the forward viewing image sensor, information pertaining to lane geometry of the lane of the road along which the equipped vehicle is traveling.

* * * * *

UNITED STATES PATENT AND TRADEMARK OFFICE
CERTIFICATE OF CORRECTION

PATENT NO. : 9,950,707 B2
APPLICATION NO. : 15/488715
DATED : April 24, 2018
INVENTOR(S) : Honghao Tan et al.

Page 1 of 1

It is certified that error appears in the above-identified patent and that said Letters Patent is hereby corrected as shown below:

In the Claims

Column 13:
Line 25, Claim 31, "being driven" should be --driven--

Signed and Sealed this
Fourteenth Day of August, 2018

Andrei Iancu
*Director of the United States Patent and Trademark Office*